United States Patent
Grand et al.

(10) Patent No.: US 6,631,960 B2
(45) Date of Patent: Oct. 14, 2003

(54) SERIES REGENERATIVE BRAKING TORQUE CONTROL SYSTEMS AND METHODS

(75) Inventors: Kerry Eden Grand, Chesterfield, MI (US); Vinod Reddy, Ocala, FL (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/683,171

(22) Filed: Nov. 28, 2001

(65) Prior Publication Data

US 2003/0132664 A1 Jul. 17, 2003

(51) Int. Cl.⁷ .............................................. B60T 8/64
(52) U.S. Cl. ...................................... 303/152; 303/163
(58) Field of Search ............................ 303/152, 163, 303/164, 165, 3; 701/108; 320/134; 180/65.2, 65.7, 65.8, 65.3

(56) References Cited

U.S. PATENT DOCUMENTS

| | | | |
|---|---|---|---|
| 3,790,227 A | * 2/1974 | Dozier | 303/163 |
| 5,358,317 A | * 10/1994 | Cikanek | 303/152 |
| 5,450,324 A | * 9/1995 | Cikanek | 701/108 |
| 5,476,310 A | * 12/1995 | Ohtsu et al. | 303/3 |
| 5,492,192 A | 2/1996 | Brooks et al. | |
| 5,615,933 A | 4/1997 | Kidston et al. | |
| 5,667,286 A | * 9/1997 | Hoying et al. | 303/140 |
| 5,773,962 A | * 6/1998 | Nor | 320/134 |
| 5,788,023 A | 8/1998 | Schöner et al. | |
| 5,853,229 A | 12/1998 | Willmann et al. | |
| 5,898,282 A | 4/1999 | Drozdz et al. | |
| 6,005,358 A | * 12/1999 | Radev | 180/65.7 |
| 6,033,041 A | 3/2000 | Koga et al. | |
| 6,086,166 A | 7/2000 | Fukasawa | |
| 6,099,089 A | 8/2000 | Schneider | |
| 6,122,588 A | 9/2000 | Shehan et al. | |
| 6,484,830 B1 | * 11/2002 | Gruenwald et al. | 180/65.2 |

FOREIGN PATENT DOCUMENTS

WO    WO 97/10966    3/1997

* cited by examiner

*Primary Examiner*—Christopher P. Schwartz
*Assistant Examiner*—Melanie Torres
(74) *Attorney, Agent, or Firm*—Seed IP Law Group PLLC

(57) ABSTRACT

Regenerative braking systems and methods for use in an electric vehicle, such as a battery-powered vehicle, a fuel cell vehicle, and a hybrid electric vehicle, including an electric motor system operable for generating torque to drive and control the electric vehicle, a traction controller operable for controlling the electric motor system, a brake system operable for generating torque to drive and control the electric vehicle, and a brake controller operable for controlling the brake system. Traction functions are strictly allocated to the traction controller, braking functions are strictly allocated to the brake controller, and the brake controller is subordinated to the traction controller. The regenerative braking systems and methods also including a communications system operable for transferring information between the traction controller and the brake controller.

35 Claims, 3 Drawing Sheets

```
If (vehicle is moving forward) {

If (final torque request < maximum regenerative limit) {
    final regenerative torque = maximum regenerative limit;  // clamp to maximum regenerative available
    final brake torque = friction brake desired + abs (maximum regenerative limit – final torque request desired);
      // make up the difference with brakes Else
    final regenerative torque = final torque request desired;  // do nothing with limits
    final brake torque = friction brake desired;
  End if } }

Else if (vehicle is moving backwards) {

If (final torque request > maximum regenerative limit) {
    final regenerative torque = maximum regenerative limit;  // clamp to maximum regenerative available
    final brake torque = friction brake desired + abs (maximum regenerative limit – final torque request desired);
      // make up the difference with brakes Else
    final regenerative torque = final torque request desired;  // do nothing with limits
    final brake torque = friction brake desired;
  End if } }
```

*FIG. 3*

SERIES REGENERATIVE BRAKING TORQUE CONTROL SYSTEMS AND METHODS

BACKGROUND OF INVENTION

1. Field of the Invention

The present invention relates generally to regenerative braking systems and methods for use in an electric vehicle, such as a battery-powered vehicle, a fuel cell vehicle, and a hybrid electric vehicle. More specifically, the present invention relates to series regenerative braking torque control systems and methods for use in an electric vehicle having brake-by-wire capability.

2. Background of the Invention

Regenerative braking techniques may be utilized by the manufacturer of an electric vehicle (EV), such as a battery-powered vehicle, a fuel cell vehicle, and a hybrid electric vehicle (HEV), as a means of increasing the overall efficiency of the electric vehicle. The basic premise of regenerative braking is to recover as much of the kinetic energy of the electric vehicle as possible during braking or slowing by operating an electric motor system as a generator system and restoring the generated electrical energy to an energy storage or battery system. This kinetic energy is otherwise dissipated as heat by a traditional hydraulic braking system.

In an electric vehicle utilizing only a hydraulic braking system, propulsion or traction functions and hydraulic braking functions are controlled by separate microcontrollers or microprocessors, including, for example, a traction controller and a brake controller. Because these functions are separated, minimum information must be shared by the microprocessors and the architectural integrity of the overall system is maintained. In an electric vehicle utilizing a regenerative braking system, however, the traction controller typically controls traction functions and regenerative braking functions. The brake controller typically controls hydraulic braking functions and regenerative braking functions. Thus, information must be shared by the microprocessors and the architectural integrity of the overall system breaks down.

Thus, what is needed are regenerative braking systems and methods which separate the traction functions, the hydraulic braking functions, and the regenerative braking functions, allocating the traction functions and the regenerative braking functions to the traction controller and the hydraulic braking functions to the brake controller. Such systems and methods would allow the amount of information which must be shared by the microprocessors to be minimized and the architectural integrity of the overall system to be maintained.

SUMMARY OF INVENTION

The present invention provides regenerative braking systems and methods which allocate the traction functions and the regenerative braking functions to the traction controller and the hydraulic braking functions to the brake controller. This allows the regenerative functions to be performed in a simple and elegant manner. Minimum information must be shared by the microprocessors and the architectural integrity of the overall system is maintained.

In one embodiment, a regenerative braking system for use in an electric vehicle includes an electric motor system operable for generating torque to drive and control the electric vehicle, a traction controller operable for controlling the electric motor system, a brake system operable for generating torque to drive and control the electric vehicle, and a brake controller operable for controlling the brake system. Traction functions are strictly allocated to the traction controller, braking functions are strictly allocated to the brake controller, and the brake controller is subordinated to the traction controller. The regenerative braking system also includes a communications system operable for transferring information between the traction controller and the brake controller.

In another embodiment, a regenerative braking method for use in an electric vehicle includes providing an electric motor system operable for generating torque to drive and control the electric vehicle, providing a traction controller operable for controlling the electric motor system, providing a brake system operable for generating torque to drive and control the electric vehicle, and providing a brake controller operable for controlling the brake system. Traction functions are strictly allocated to the traction controller, braking functions are strictly allocated to the brake controller, and the brake controller is subordinated to the traction controller. The regenerative braking method also includes transferring information between the traction controller and the brake controller.

BRIEF DESCRIPTION OF DRAWINGS

FIG. 3 is a an example of one embodiment of a limit check algorithm utilized by the series regenerative braking torque control systems and methods of the present invention.

DETAILED DESCRIPTION

Figure 1:
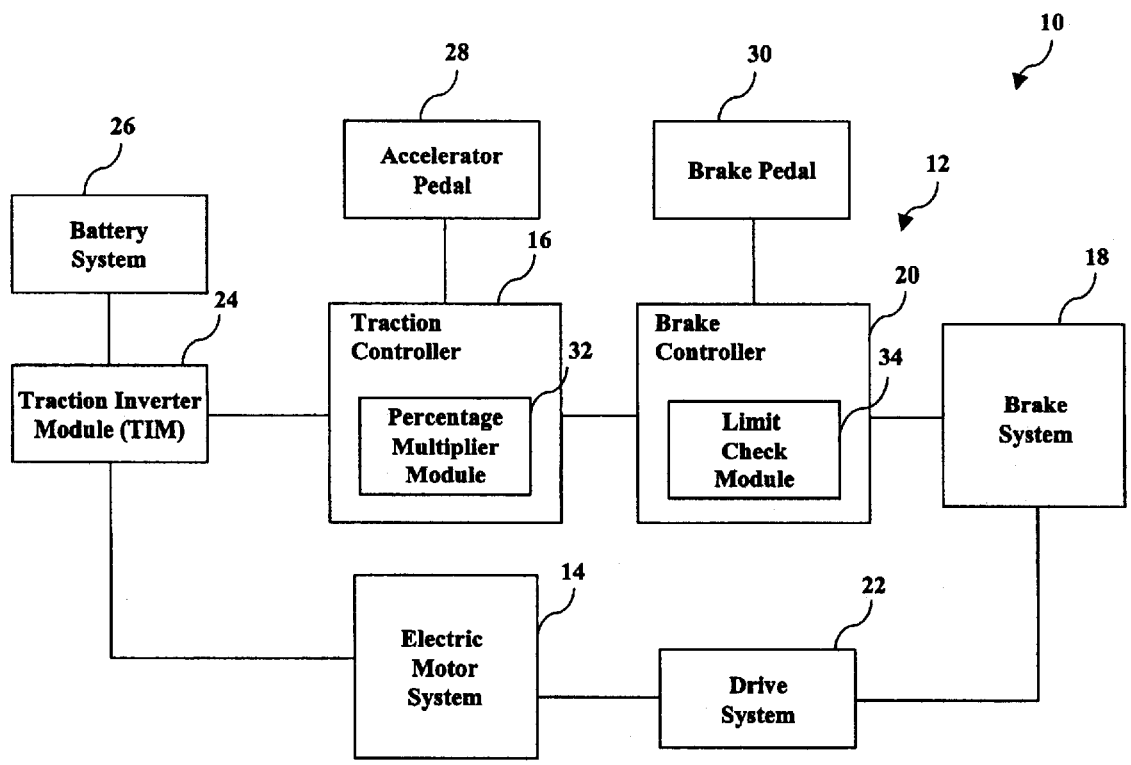
FIG. 1 is a functional block diagram of one embodiment of an electric vehicle utilizing the series regenerative braking torque control system of the present invention.

Referring to FIG. 1, in one embodiment, an electric vehicle (EV) 10, such as a battery-powered vehicle, a fuel cell vehicle, and a hybrid electric vehicle (HEV), utilizing the series regenerative braking torque control system 12 of the present invention includes an electric motor system 14, a traction controller 16, a brake system 18, and a brake controller 20. The electric motor system 14 is operatively connected to a drive system 22, a traction inverter module (TIM) 24, and an energy storage or battery system 26. The traction controller 16 is operatively connected to an accelerator pedal 28. The brake system 18 is operatively connected to the electric motor system 14 and the drive system 22. The brake controller 20 is operatively connected to a brake pedal 30. The EV 10, in the case of an HEV, may also include an internal combustion engine (ICE).

The electric motor system 14 includes an electric motor, such as a traction motor and a field-oriented induction motor, operable for generating torque to drive and control the EV 10. The electric motor is also operable for charging the batteries associated with the battery system 26. The battery system 26 may include a high-voltage battery or fuel cell and an auxiliary battery, such as a 12V accessory battery. The TIM 24 is operable for converting DC current generated by the high-voltage battery or fuel cell into AC current capable of powering the electric motor. The electric motor, in combination with a transaxle, is operable for converting the electrical energy provided by the battery system 26 into mechanical energy which turns wheels of the EV 10. Optionally, this torque is supplemented by torque generated by the ICE. The power conversion system of the EV 10 may also include a DC/DC converter, such as a unidirectional or bidirectional DC/DC converter, operable for stepping the voltage associated with the EV's high-voltage battery or fuel cell down to that which the alternator of an ICE-powered vehicle would typically generate (13.5 to 14V). The DC/DC converter is typically used to charge the auxiliary battery, which is often separated from the potentially-dangerous high-voltage battery or fuel cell. Although an AC electric motor system, including a single electric motor, has been described herein, DC motors, such as brushless DC motors, may also be utilized in conjunction with the systems and methods of the present invention. In the event that DC motors are utilized, the TIM 24 is not necessary and may be replaced with an appropriate module of a type well known to those skilled in the art. Optionally, multiple electric motors, AC or DC, may also be utilized to drive and control the EV 10.

The drive system 22 preferably includes the transaxle, which is a combination of two sets of gears, a transmission and a differential. The transmission allows the gear ratio of the transaxle to be adjusted and the differential allows the wheels of the EV 10 to rotate at different speeds. Drive axles are connected, through constant velocity (CV) joints, to the wheels. The transaxle combines the transmission, the differential, and the drive axles into a compact unit, saving weight and volume inside the operator compartment of the EV 10. The drive system 22 may also include a plurality of other power-transmitting components positioned between the electric motor and the wheels of the EV 10, including a clutch, a torque converter, universal (U) joints, and a drive shaft. The accelerator pedal 28 provides an accelerator command to the traction controller 16, which responsively controls the TIM 24 via a command line to provide power to the electric motor system 14 and thereby provide motive force to the wheels of the EV 10. Although the use of a clutch has been described herein, a clutch need not be utilized in conjunction with the systems and methods of the present invention. Adequate performance may be achieved without the necessity of a gear-shifting transmission as, to reverse the EV 10, the direction of rotation of the electric motor may simply be reversed. Reduction gearsets of a type suitable for use in the drive system 22 are well known to those skilled in the art.

The traction controller 16 may utilize any suitable microprocessor-based microcontroller operable for providing control commands to the type of TIM 24 and electric motor system 14 utilized. A percentage multiplier module 32 is disposed within the traction controller 16. The accelerator pedal 28 preferably responds to operator-generated commands in a conventional manner, providing output signals through an actuator operable for converting accelerator pedal position to an electrical signal. Optionally, the actuator includes redundant potentiometers which provide two or more accelerator pedal position signals to the traction controller 16. This type of accelerator pedal 28 may be implemented by those skilled in the art.

The brake system 18 preferably includes a hydraulic braking system and a regenerative braking system. The hydraulic braking system may include, for example, a master cylinder, hydraulic lines, an accumulator, pressure transducers, actuators, solenoid valves, brake calipers, brake discs, and brake drums. The master cylinder may be a conventional master cylinder including a reservoir operatively connected to the hydraulic lines. The accumulator may have chambers on either side, allowing for the accumulation of hydraulic fluid by the compression of a center spring between two pistons. The pressure transducers may be may be any suitable type of pressure transducers operable for providing signals indicative of the pressure in the brake lines. The actuators may be existing anti-lock brake actuators. Responding to operator depression of the brake pedal 30, the brake controller 20 provides information to the brake system 18 which monitors and controls the rotational speed of the wheels of the EV 10. The electric motor, when commanded, provides regenerative braking force by generating power and coupling the generated power to the battery system 26, thereby providing braking torque to the wheels of the EV 10.

The brake controller 20 may utilize any suitable microprocessor-based microcontroller operable for providing control commands to the type of brake system 18 utilized and for receiving input signals from a parking brake switch, a brake pedal switch, and the pressure transducers. A limit check module 34 is disposed within the brake controller 20. The brake pedal 30 responds to operator-generated commands in a conventional manner, providing output signals through an actuator operable for converting brake pedal position to an electrical signal. The brake pedal 30 is preferably operatively connected to the brake pedal switch such that it may be used to turn-on rear brake lights. This type of brake pedal 30 may be implemented by those skilled in the art.

The traction controller 16 and the brake controller 20 may communicate with each other over a serial data link and other dedicated communication lines, such as via standard corporate protocol (SCP), a universal asynchronous/synchronous receiver/transmitter (UART), a controller-area network (CAN), or via pulse-width modulation (PWM) and discrete inputs/outputs to the microprocessors. Although a series regenerative braking torque control system 12 utilizing a traction controller 16 and a brake controller 20 has been described herein, additional microprocessors may also be utilized in conjunction with the systems and methods of the present invention to control the traction functions, the hydraulic braking functions, and the regenerative braking functions. The series regenerative braking torque control systems and methods described herein may be utilized in conjunction with any EV 10 having brake-by-wire capability.

Figure 2:
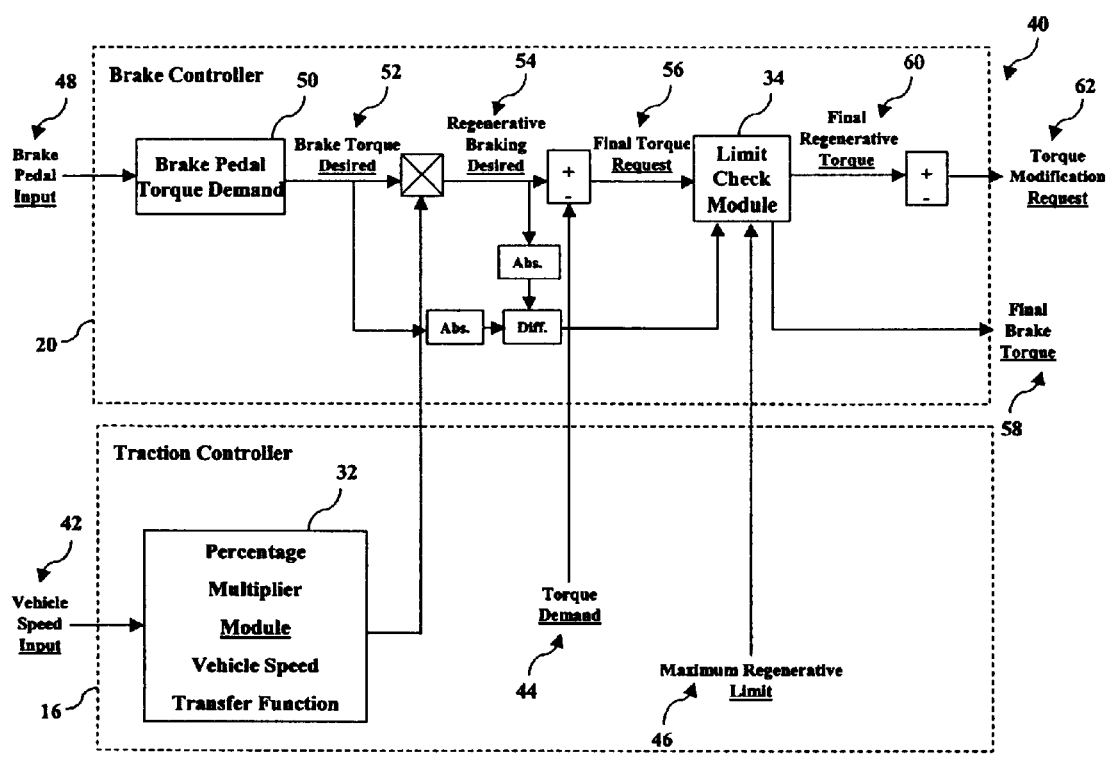
FIG. 2 is a schematic diagram of one embodiment of the series regenerative braking torque control method of the present invention.

Referring to FIG. 2, in one embodiment, the series regenerative braking torque control method 40 of the present invention utilizes a function decoupling concept. The traction controller 16 acts upon the propulsion and regenerative functions and the brake controller 20 acts upon the braking functions while requesting a change in propulsion torque when appropriate. Architecturally, the traction functions are strictly allocated to the traction controller 16 and the braking functions are strictly allocated to the brake controller 20. Regenerative braking is achieved with a minimum amount of information sharing between the traction controller 16 and the brake controller 20. The series regenerative braking torque control method 40 of the present invention is capable of handling roll-back strategies, two-footed driving strategies, and anti-wheel spin strategies, and the like.

In operation, the percentage multiplier module 32 disposed within the traction controller 16 receives a vehicle speed input 42. A piecewise-linear transfer function is applied to the vehicle speed input 42 to generate a percentage multiplier which is communicated to the brake controller 20. The piecewise-linear transfer function is preferably zero (0) below a predetermined maximum creep speed limit of the EV 10 (FIG. 1) (such as 6 mph, or another suitable calibrateable value) and increases or decreases to 100% at about double the predetermined maximum creep speed limit of the EV 10. Above this value, the percentage multiplier remains at 100%. This allows regenerative braking and hydraulic braking or friction braking to be blended in a manner that is not perceivable to an operator.

The traction controller 16 is also operable for calculating a torque demand 44 based on the accelerator pedal position and communicating this torque demand 44 to the brake controller 20. The traction controller 16 is further operable for calculating a maximum regenerative limit 46 based on the vehicle speed input 42 and the high-voltage battery or fuel cell voltage. This maximum regenerative limit 46 is communicated to the brake controller 20 as well, taking into account the speed and direction of the EV 10.

The brake controller 20 receives a brake pedal input 48 and determines a brake pedal torque demand 50 and a brake torque desired 52. The brake controller 20 then allows the traction controller 16 to determine the amount of regenerative braking to apply by incorporating the percentage multiplier. Specifically, after the brake controller 20 determines the amount of brake torque desired 52 based on the brake pedal input 48, the brake controller 20 multiplies the brake torque desired 52 by the percentage multiplier received from the percentage multiplier module 32 disposed within the traction controller 16. The result is the regenerative braking desired 54. The regenerative braking desired 54 is added to or subtracted from the torque demand 44, resulting in a final torque request 56. This final torque request 56 and the maximum regenerative limit 46 calculated by the traction controller 16 are then communicated to the limit check module 34 which performs a limit check in order to maintain the maximum regenerative limit 46 calculated by the traction controller 16. FIG. 3 provides an example of one embodiment of a limit check algorithm or pseudo code 70 utilized by the series regenerative braking torque control systems and methods of the present invention. After the limit check, a final brake torque 58 results. The final regenerative torque 60 is also combined with the torque demand 44 calculated by the traction controller 16 to generate a torque modification request 62.

It is apparent that there has been provided, in accordance with the present invention, regenerative braking systems and methods for use in an electric vehicle. While the present invention has been particularly shown and described in conjunction with examples and preferred embodiments thereof, it will be appreciated that variations in and modifications to the present invention may be effected by persons of ordinary skill in the art without departing from the spirit or scope of the invention. It is therefore to be understood that the principles described herein apply in a similar manner, where applicable, to all examples and preferred embodiments intended to be covered by the following claims.

What is claimed is:

1. A regenerative braking system for use in an electric vehicle, the regenerative braking system comprising:
   an electric motor system operable to generate torque to drive and control the electric vehicle;
   a traction controller coupled to receive a vehicle speed input from a vehicle speed sensor and operable to control the electric motor system and to produce a percentage multiplier based on the vehicle speed input;
   a brake system operable to generate torque to drive and control the electric vehicle; and
   a brake controller coupled to receive the percentage multiplier from the traction controller and operable to control the brake system.

2. The regenerative braking system of claim 1, wherein traction functions are strictly allocated to the traction controller.

3. The regenerative braking system of claim 1, wherein braking functions are strictly allocated to the brake controller.

4. The regenerative braking system of claim 1, further comprising a communications system operable to transfer information between the traction controller and the brake controller.

5. The regenerative braking system of claim 1, wherein the brake controller is subordinate to the traction controller.

6. The regenerative braking system of claim 1, wherein the traction controller further comprises a percentage multiplier module disposed within the traction controller, the percentage multiplier module operable to generate the percentage multiplier.

7. The regenerative braking system of claim 1, wherein the traction controller is operable to generate a torque demand.

8. The regenerative braking system of claim 1, wherein the traction controller is operable to generate a maximum regenerative limit.

9. The regenerative braking system of claim 1, wherein the brake controller is coupled to receive a brake pedal input.

10. The regenerative braking system of claim 1, wherein the brake controller further comprises a limit check module disposed within the brake controller, the limit check module operable to perform a torque limit check in order to maintain a maximum regenerative limit generated by the traction controller.

11. The regenerative braking system of claim 1, wherein the brake controller is operable to generate a final brake torque.

12. The regenerative braking system of claim 1, wherein the brake controller is operable to generate a torque modification request.

13. The regenerative braking system of claim 1, wherein the electric vehicle comprises an electric vehicle selected from the group consisting of a battery-powered vehicle, a fuel cell vehicle, and a hybrid electric vehicle.

14. The regenerative braking system of claim 1, further comprising wires coupled between the brake controller and the brake system to carry signals to control the brake system in response to the brake controller.

15. A regenerative braking system for use in an electric vehicle, the regenerative braking system comprising:
   an electric motor system operable to generate torque to drive and control the electric vehicle;
   a traction controller operable to control the electric motor system wherein the traction controller comprises:
      a percentage multiplier module disposed within the traction controller wherein the percentage multiplier module is operable to generate a percentage multiplier utilizing a piecewise-linear transfer function;
   a brake system operable to generate torque to drive and control the electric vehicle; and
   a brake controller operable to control the brake system.

16. The regenerative braking system of claim 15, wherein the brake controller is operable to incorporate the percentage multiplier generated by the traction controller.

17. A regenerative braking system for use in an electric vehicle, the regenerative braking system comprising:
   an electric motor system operable to generate torque to drive and control the electric vehicle;
   a traction controller operable to control the electric motor system wherein the traction controller comprises:

a percentage multiplier module disposed within the traction controller wherein the percentage multiplier module is operable to generate a percentage multiplier utilizing a piecewise-linear transfer function and wherein the piecewise-linear transfer function is approximately 0% below a predetermined maximum creep speed limit;

a brake system operable to generate torque to drive and control the electric vehicle; and a brake controller operable to control the brake system.

18. A regenerative braking system for use in an electric vehicle, the regenerative braking system comprising:

an electric motor system operable to generate torque to drive and control the electric vehicle;

a traction controller operable to control the electric motor system wherein the traction controller comprises:

a percentage multiplier module disposed within the traction controller wherein the percentage multiplier module is operable to generate a percentage multiplier utilizing a piecewise-linear transfer function and wherein the piecewise-linear transfer function is 100% above double a predetermined maximum creep speed limit;

a brake system operable to generate torque to drive and control the electric vehicle; and a brake controller operable to control the brake system.

19. A regenerative braking method for use in an electric vehicle, the regenerative braking method comprising:

receiving a vehicle speed input at a traction controller from a vehicle speed sensor;

producing a percentage multiplier at the traction controller based on the vehicle speed input;

controlling an electric motor system by the traction controller to drive and control the electric vehicle;

providing a brake system operable for generating torque to drive and control the electric vehicle;

receiving the percentage multiplier at a brake controller from the traction controller; and controlling a brake system by the brake controller to drive and control the electric vehicle.

20. The regenerative braking method of claim 19, further comprising strictly allocating traction functions to the traction controller.

21. The regenerative braking method of claim 19, further comprising strictly allocating braking functions to the brake controller.

22. The regenerative braking method of claim 19, further comprising transferring information between the traction controller and the brake controller.

23. The regenerative braking method of claim 19, further comprising subordinating the brake controller to the traction controller.

24. The regenerative braking method of claim 19, further comprising generating a torque demand utilizing the traction controller.

25. The regenerative braking method of claim 19, further comprising generating a maximum regenerative limit utilizing the traction controller.

26. The regenerative braking method of claim 19, further comprising providing a brake pedal input to the brake controller.

27. The regenerative braking method of claim 19, further comprising incorporating a percentage multiplier generated by the traction controller into the brake controller.

28. The regenerative braking method of claims 19, further comprising performing a torque limit check utilizing a limit check module disposed within the brake controller in order to maintain a maximum regenerative limit generated by the traction controller.

29. The regenerative braking method of claim 19, further comprising generating a final brake torque utilizing the brake controller.

30. The regenerative braking method of claim 19, further comprising generating a torque modification request utilizing the brake controller.

31. The regenerative braking method of claim 19, wherein the electric vehicle comprises an electric vehicle selected from the group consisting of a battery-powered vehicle, a fuel cell vehicle, and a hybrid electric vehicle.

32. The regenerative braking method of claim 19, further comprising transmitting control signals from the brake controller to the brake system by wire.

33. A regenerative braking method for use in an electric vehicle the regenerative braking method, comprising:

providing an electric motor system operable for generating torque to drive and control the electric vehicle, providing a traction controller operable for controlling the electric motor system, generating a percentage multiplier utilizing a percentage multiplier module disposed within the traction controller wherein generating the percentage multiplier comprises:

utilizing a piecewise-linear transfer functions;

providing a brake system operable for generating torque to drive and control the electric vehicle; and providing a brake controller operable for controlling the brake system.

34. A regenerative braking method for use in an electric vehicle the regenerative braking method comprising:

providing an electric motor system operable for generating torque to drive and control the electric vehicle;

providing a traction controller operable for controlling the electric motor system, generating a percentage multiplier utilizing a percentage multiplier module disposed within the traction controller wherein generating the percentage multiplier comprises:

utilizing a piecewise-linear transfer function wherein the piecewise-linear transfer function is approximately 0% below a predetermined maximum creep speed limit, providing a brake system operable for generating torque to drive and control the electric vehicle; and providing a brake controller operable for controlling the brake system.

35. A regenerative braking method for use in an electric vehicle, the regenerative braking method comprising:

providing an electric motor system operable for generating torque to drive and control the electric vehicle;

providing a traction controller operable for controlling the electric motor system;

generating a percentage multiplier utilizing a percentage multiplier module disposed within the traction controller wherein generating the percentage multiplier comprises:

utilizing a piecewise-linear transfer function wherein the piecewise-linear transfer function is 100% above double a predetermined maximum creep speed limit;

providing a brake system operable for generating torque to drive and control the electric vehicle; and providing a brake controller operable for controlling the brake system.

* * * * *